3,155,632
PROCESS OF PRODUCING IMPROVED
POLYVINYL ALCOHOL FIBERS
Kanji Matsubayashi and Osamu Fukushima, Kurashiki, Japan, assignors of three-fourths to Kurashiki Rayon Co., Ltd., Okayama Prefecture, Japan, a corporation of Japan, and one-fourth to Air Reduction Company, Incorporated, New York, N.Y., a corporation of New York
No Drawing. Filed July 15, 1960, Ser. No. 42,999
Claims priority, application Japan, July 16, 1959, 34/22,795
5 Claims. (Cl. 260—29.6)

This invention relates to a process of producing fibers of polyvinyl alcohol and is more particularly concerned with a process of forming such fibers which are characterized by desirable properties.

As described in U.S. patent application Ser. No. 856,334, filed December 1, 1959, the dyeability of polyvinyl alcohol fibers can be markedly increased by spinning the fibers from a mixture of an emulsified polymer formed from basic monomers and a water solution of polyvinyl alcohol. When fibers spun from such a mixture are subjected to benzalization, which has the effect of significantly improving the elasticity of polyvinyl alcohol, fibers can be obtained which have excellent elastic recovery and dyeability without showing any signifiacnt drop in dye-absorption.

It is an object of this invention to provide a novel process for producing fibers of polyvinyl alcohol having high hot water-resistance, high heat-resistance and desirable mechanical properties similar to those of fibers produced solely from polyvinyl alcohol, yet characterized by a particularly high dyeability.

In accordance with the present invention, spinning of fibers is effected from a spinning fluid prepared by dispersing in a water solution of polyvinyl alcohol an emulsion or a fine powder of a water-insoluble polymer which has had basic nitrogen introduced into the molecule by treating a polymer formed from a monomer containing groups which are easily converted into a basic nitrogen such as halogen radicals, carbonyl groups, and acid amide groups, with a reagent to cause said convertible groups to be converted to basic nitrogen, a fine powder or emulsion of the polymer containing the convertible group being caused to undergo chemical reaction to convert it to basic nitrogen while the emulsified or pulverized state is retained. We have studied extensively various methods of manufacturing emulsions of polymers which could be used to produce fibers having the above-mentioned desirable characteristics, and we have succeeded in achieving this result effectively and economically by the use of emulsions or fine powders of polymers which contain basic nitrogen and are water-insoluble by causing emulsions or fine powders of polymers formed from monomers containing convertible groups as described above, e.g. halogen radicals, carbonyl groups, or acid amide group, to undergo chemical reaction while in their emulsified or pulverized form, so as to convert the convertible group into a functional group containing basic nitrogen.

It has been found that when a spinning fluid is prepared by incorporating the emulsions or fine powder produced by the method of this invention in a water solution of polyvinyl alcohol, no difficulty in spinning is encountered and it is possible to achieve the advantageous results described in said application Ser. No. 856,334 without difficulty.

We have also found that when subjected to thermal stretching, which is effective to promote hot water-resistance, strength, resilience and elasticity, the fibers containing solid particles produced by this invention not only do not lose any of their dyeability but their dyeability is enhanced, the enhancement being greater the greater the percentage of thermal stretching. This is directly contrary to the behavior of fibers produced by mixed spinning of a water-soluble polymer attempted in the past. According to the method of this invention, it is possible to obtain particle sizes ranging from $0.01\mu$ to $10\mu$ and it has been found that the greater the particle size, the more significant will be the increase in dyeability after benzalization. The reason for this behavior is not completely understood. However, it is believed to be the fact that the solid particles of the fine powder or emulsion are difficultly affected by the structure of the polyvinyl alcohol portion of the fiber, and even when the polyvinyl alcohol portion has been made hydrophobic by benzalization, it still retains a structure which is easily penetrated by dyestuffs. However, when the particle size or the size of coagulation product is significantly large, disadvantages or defects such as broken yarns or fluffy yarns may increase at the time of spinning, with subsequent deterioration in the mechanical properties of the fiber. Therefore, it is important to restrict the size of the particles to a value of $30\mu$ or below. The emulsified reaction product or the spinning fluid containing fine particles produced in accordance with the method of this invention is stable, and contains no particle or fine powder of a magnitude of $10\mu$ or larger, which is sufficient to attain a smooth spinning operation.

As the result of electrical repulsion and the degree of hydrophile qualities imparted to the particles, the stability and compatibility with polyvinyl alcohol markedly increases, so that the mixing, filtering, and spinning of the spinning fluid are very much facilitated. However, when the amount of nitrogen introduction is excessively large, the polymer may turn to be water-soluble because it becomes hydrophilic by reason of the amount of the introduced basic nitrogen. Accordingly, it is undesirable to increase the content of basic nitrogen excessively. Thus, the optimum limit cannot be specifically defined, since it depends upon the hydrophobic qualities of the polymer and the hydrophilic qualities of the basic nitrogen. However, the amount of basic nitrogen to be introduced by chemical reaction is suitably 0.2% or more, e.g. 0.2 to 5% and the ratio of mixing of such polymers with polyvinyl alcohol is adequate if it produces a mixture of a 0.05–2% content of basic nitrogen. By such admixture, a marked increase in the dyeability of the produced fibers is noted with direct cotton dyes and with acid wool dyes, whereas any drop in hot water-resistance, heat-resistance and other mechanical properties is negligible.

The emulsions of polymers containing convertible radicals, such as halogen radicals, carbonyl radicals and acid amide radicals, to be used in the present invention can easily be prepared by emulsion polymerization or suspension polymerization of monomers containing these radicals in the presence of conventional surface-active agents or protective colloids, or by emulsion copolymerization or suspension copolymerization between the above-mentioned monomers and other monomers containing these radicals or monomers which do not contain these radicals. It is also possible to obtain emulsions of such polymers by a process in which, after a polymer containing a convertible radical is dissolved in an organic solvent which is immiscible with water, the solution is mixed with and dispersed in a water solution which contains a surface-active agent or a protective colloid, and then the organic solvent is removed. In general, various known types of anionic, non-ionic, and cationic surface-active agents are suitably used. However, when basic nitrogen is introduced by chemical reaction, an anionic surface-active agent often may form a bond with the introduced basic nitrogen to coagulate the emulsion. Hence, it is preferred to use a non-ionic surface-active agent such as polyoxyethylenedodecyl ether, or a cationic surface-active agent such as dodecyltrimethylammonium chloride. As the protective colloid, water-soluble polymers such as polyvinyl alcohol, partial-saponification products of polyvinyl acetate, gelatin, soluble starch, and aminoacetalized polyvinyl alcohol, and the like are suitably used. In this case, it is also desirable that a non-ionic or cationic polymer be used for the reason referred to in connection with the surface-active agent. It is generally possible to carry out the chemical-reaction while maintaining the emulsified or fine powder state without difficulty. However, when a salt is used, coagulation does sometimes take place due to low stability against such salts. In order to avoid this, various means may be employed. For instance, such coagulation may be avoided by lowering the concentration of the reacting fluid or by adding an organic solvent, e.g. a lower alkyl alcohol such as methanol.

As monomers containing a halogen radical, there are suitably used ethylenically unsaturated lower alkyl halides, e.g. containing up to 6 carbon atoms, such as vinyl chloride, allyl chloride, allyl bromide, allyl iodide, isopropenyl chloride, and the like. As monomers containing the carbonyl group, there are suitably used ethylenically unsaturated lower alkyl aldehydes and ketones such as acrolein, crotonaldehyde, methylvinylketone, methylisopropenylketone, and the like. The term "amide" is employed herein to include "imide" groups. As monomers containing the acid amide group there are suitably used N-vinyl amides of alkyl mono- and dibasic acids and of aromatic mono- and dibasic acids such as N-vinylsuccinimide, N-vinylphthalimide, N-vinylacetamide, and the like.

Monomers which do not have any of the above-mentioned radicals or groups but which are suitably copolymerized with monomers containing such groups include styrene, vinyl acetate, vinyl benzoate, butadiene, methyl acrylate, methyl methacrylate, acrylonitrile, vinylidene cyanide, allyl acetate, divinylbenzene, 2-methyl-5-vinylpyridine, allylamine, and like ethylenically-unsaturated hydrocaarbons, esters, nitriles, amines and heterocyclic compounds.

Conversion to basic nitrogen is suitably effected by any reaction effective for this purpose, including the reaction of ammonia or of an amine, e.g. an alkyl amine on the halogen radical, hydrogenation of the carbonyl group in the presence of ammonia or hydroxylamine, Strecker's reaction involving the use of ammonia or of an amine and inorganic cyanide compounds, such as prussic acid and ammonium cyanide, saponification of the acid amide (or imide) group, and like reactions.

The fibers spun by the method of this invention can be subjected to heat-treatment, hot-stretching, and insolubilization in the same manner as fibers produced from polyvinyl alcohol alone. For the purpose of insolubilization, not only acetalization by the use of alkyl, aralkyl and aromatic aldehydes such as formaldehyde, acetaldehyde, butyraldehyde, nonylaldehyde, benzaldehyde, monochlorobenzaldehyde, naphthaldehyde, malonaldehyde, glutaraldehyde, terephthalaldehyde, and the like is suitably effected, but treatments by means of inorganic substances such as titanation, chroming, and the like can be employed.

In accordance with this invention, it is also possible to carry out spinning with spinning fluids containing fine particles of polymers as described above to which have been added water-soluble polymers such as soluble starch, aminoacetalized polyvinyl alcohol, polyvinylpyrrolidone, and the like, pigments such as titanium oxide, and the like, salts such as zinc sulfate, sodium sulfate, and the like. Consequently, it is practicable to effect simultaneous improvements in transparency and in the form of the cross-section of the fibers, particularly in the case of wet-spinning.

The invention will be further understood from the following specific examples of practical application. However, it will be understood that these examples are not to be construed as limiting the scope of the present invention in any manner. In these examples, all parts are by weight, unless otherwise indicated. The percentages indicated above are also by weight.

Example 1

A mixture composed of vinyl acetate (73 g.), allyl chloride (11.4 g.), polyvinyl alcohol (17.7 g.), polyoxyethylene (20 mol percent), lauryl ether (13.5 g.), potassium persulfate (1.5 g.), sodium bisulfite (0.8 g.) and water (506 g.) was stirred at 60° C. for 8 hours to effect emulsion polymerization. The unreacted monomers were removed by steam distillation, and there was recovered a polymer emulsion having a solids concentration of 10.5%, in a yield of 75%.

This emulsion (500 g.) was mixed with 10% aqueous ammonia (500 g.), and after the mixture was heated in an autoclave at 70° C. for 48 hours, it was dialyzed in running water in order to purify it. The polymer emulsion containing basic nitrogen thus obtained was mixed with 15% of polyvinyl alcohol to produce a spinning fluid and this fluid was wet-spun into a coagulating bath composed of sodium sulfate. After heat-treatment of the spun fibers at 235° C. for 30 sec. at constant length, the fibers were formalized in a bath consisting of formaldehyde (5%), sulfuric acid (15%) and sodium sulfate (15%) at 70° C. for one hour. The degree of formalization was 38 mol percent, and the nitrogen content of the fibers was 1.0%. These fibers shrank by 4.1% when treated in boiling water for 30° C. Their dry thermal softening point was 210° C., their strength 3.9 g./denier, and their elongation 27%. When the fibers were dyed with acid brilliant scarlet 3R (2%) and sulfuric acid (2%) (percentages based on the weight of fiber) at 80° C. for one hour, the fibers were observed to absorb the dye perfectly. On the other hand, fibers spun from a water solution of polyvinyl alcohol alone and heat-treated and formalized under the conditions described above exhibited approximately an equal degree of hot-water resistance, and corresponding mechanical properties, but they exhibited no dyeability at all when tested with acid brilliant scarlet 3R.

Example 2

A mixture composed of methylvinylketone (100 g.), ammonium persulfate (1 g.), laurylpyridiniumchloride (20 g.) and water (800 g.) was subjected to emulsion polymerization at 60° C. for 10 hours. After purification as described in Example 1, 900 g. of an emulsion of polymethylvinylketone was obtained having a concentration of 10.1%.

While this emulsion was being slowly stirred at 60° C., a water solution consisting of ethylenediamine (30 g.) and prussic acid (13.5 g.) was added to its dropwise, and the mixture was allowed to stand for 5 hours. The small amount of unreacted substances was then removed by dialysis, and an emulsion of the polymer containing basic nitrogen was obtained. The particle size of the polymer was about $0.1\mu$.

This emulsion was mixed with 15% of polyvinyl alcohol and the total polymer concentration was then adjusted to 15%. The spinning fluid thus prepared was wet-spun into a coagulation bath composed of sodium sulfate. The fibers produced by this spinning were then stretched 100% at 230° C. for 30 sec., and relaxed by 20% at 235° C. for 30 sec. The fibers were benzalized in a bath containing benzaldehyde (3%), sulfuric acid (10%) and methanol (40%) at 60° C. for one hour. The degree of benzalization of the fibers was 27.5 mol percent, and the content of basic nitrogen was 0.6%. These fibers underwent shrinkage of 5.7% when treated in boiling water for 30 min. They showed a dry thermal softening point of 205° C., a strength of 5.9 g./denier, elongation of 26%, and elasticity of 78% at 3% elongation. When these fibers were dyed with the acid dye and under the conditions described in Example 1, the rate of absorption of the dye reached 95%. When the fibers were dyed with 2% Nippon Fast Violet BB conc., a direct cotton dye, and 10% sodium sulfate (based on the weight of fiber) at 90° C. for 2 hours, the absorption of dye was 70%, giving a saturated color. The spinning fluid prepared as described above was stable, and even when it was left at 90° C. for 48 hours, no coagulated particles of over 10µ in size were observed.

*Example 3*

A mixture composed of acrylnitrile (150 g.), N-vinyl-succinimide (50 g.), polyvinyl alcohol (50 g.), polyoxyethylene (20 mol percent) lauryl ether (20 g.) potassium persulfate (2 g.) and water (1.2 1.) was agitated at 60° C. for 8 hours to effect emulsion polymerization, and the product was purified by steam distillation and dialysis.

To the emulsion thus obtained, there was added a 2% aqueous caustic soda solution, and after the mixture was reacted at 50° C. for 24 hours, purification of the reaction product was effected by means of dialysis. The purified product was then mixed with 15% of polyvinyl alcohol and thereby a spinning fluid having a total polymer concentration of 35% was produced. This fluid was dry-spun by forcing it through a spinning nozzle of 0.3 mm. diameter into air. The fibers thus produced were stretched by 400% at 220° C. and then relaxed by 15% at 225° C. Benzalization of the fibers was effected under the conditions described in Example 2.

The degree of acetalization of the benzalized fibers was 29.0 mol percent. When the fibers were treated in boiling water for 30 min., they shrank by 7.0%, and they exhibited a strength of 2.8 g./denier, and an elongation of 23%. When dyed with an acid dye or a direct cotton dye, as described in Examples 1 and 2, the greater part of the dye was absorbed, giving a bright saturated color. These fibers had an elasticity of 81% at an elongation of 3%, and had a feel very rich in elasticity.

The surface-active or dispersing agents or dispersants and protective colloids which are suitably employed are, in addition to those mentioned above, any of the many dispersing agents and protective colloids known to those skilled in the art of making emulsions or dispersions of polymers.

It will therefore be understood that, unless otherwise indicated, conventional operations and conventional apparatus are employed in carrying out the process of this invention, including conventional mixing and emulsifying processes and units. Similarly, conventional dyeing techniques and apparatus are suitably employed upon the fibers produced by the process of this invention. The conditions and the relative relationships set forth in the examples are those preferred in carrying out the process of the invention but it will be understood that other conditions and relationships may be used within the scope of the invention.

The spinning fluids produced in accordance with the present invention are particularly suitable for the spinning of fibers in accordance with known processes used in the spinning of polyvinyl alcohol and polyvinyl alcohol derivatives, particularly the so-called "wet-spinning" techniques as described, for example, in Cline et al. U.S. Patent 2,610,360 and Osugi et al. Patent No. 2,906,594. An especially preferred spinning technique is described in copending application Serial No. 336,166 of Tomonari et al., filed February 10, 1953.

In any case, conventional dry-spinning or wet-spinning operations are employed in producing the fibers and subsequent heat-treatment, stretching and relaxation are effected using known techniques as described, for example, in said patents.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. In the manufacture of polyvinyl alcohol fibers, the steps which comprise preparing an aqueous spinning fluid comprising a mixture of a solution of polyvinyl alcohol and a polymer which is insoluble in said spinning fluid and is present in said fluid in finely-divided form, said polymer containing 0.2 to 5% of basic nitrogen and said polymer being formed from a polymer of an ethylenically-unsaturated monomer containing a group selected from the class consisting of a halogen, a carbonyl group and an acid amide group, said last-named polymer being in finely-divided form in an aqueous medium and containing a group selected from the class consisting of a halogen, a carbonyl group and an acid amide group and said basic nitrogen being introduced by converting said group to basic nitrogen while said last-named polymer is in said finely-divided form, and spinning said fluid to form fibers therefrom.

2. A process as defined in claim 1, wherein the fibers produced contain 0.05 to 2% of basic nitrogen.

3. A process as defined in claim 1, wherein said monomer is an ethylenically unsaturated lower alkylene halide.

4. A process as defined in claim 1, wherein said monomer is an ethylenically-unsaturated lower alkylene carbonyl compound.

5. A process as defined in claim 1, wherein said monomer is an ethylenically-unsaturated acid amide.

References Cited in the file of this patent

UNITED STATES PATENTS

| | | |
|---|---|---|
| 2,895,786 | Schlack | July 21, 1959 |
| 2,906,594 | Osugi | Sept. 29, 1959 |